Nov. 30, 1937.  H. D. GEYER  2,100,642

GEAR SHIFT LEVER AND RESILIENT MOUNT THEREFOR

Filed May 2, 1935

INVENTOR
Harvey D. Geyer
BY
Spencer Hardman & Fehr
HIS ATTORNEYS

Patented Nov. 30, 1937

2,100,642

UNITED STATES PATENT OFFICE 2,100,642

GEAR SHIFT LEVER AND RESILIENT MOUNT THEREFOR

Harvey D. Geyer, Dayton, Ohio, assignor to General Motors Corporation, Detroit, Mich., a corporation of Delaware Application May 2, 1935, Serial No. 19,354

4 Claims. (Cl. 74—473)

This invention relates to a resilient universal ball and socket pivot support for a gear shift lever for automobiles.

An object of this invention is to provide means for cushioning the ball of the gear shift lever in the socket in which it is mounted in order to eliminate or greatly reduce the vibrations which are ordinarily transmitted from the transmission to the gear shift lever.

Another object is to provide such a resilient socket support member which will be self-lubricating, long-lasting and efficient in use, inexpensive to manufacture, install and replace, and which will greatly facilitate the operation of shifting gears in an automobile. The simplicity of the design of the rubber socket member and the ease of assembling the lever ball therein as well as of assembling the socket member within its support are important features of this invention.

Further objects and advantages of the present invention will be apparent from the following description, reference being had to the accompanying drawing, wherein a preferred embodiment of the present invention is clearly shown.

In the drawing.

Similar reference characters refer to similar parts throughout the several views.

Figure 2:
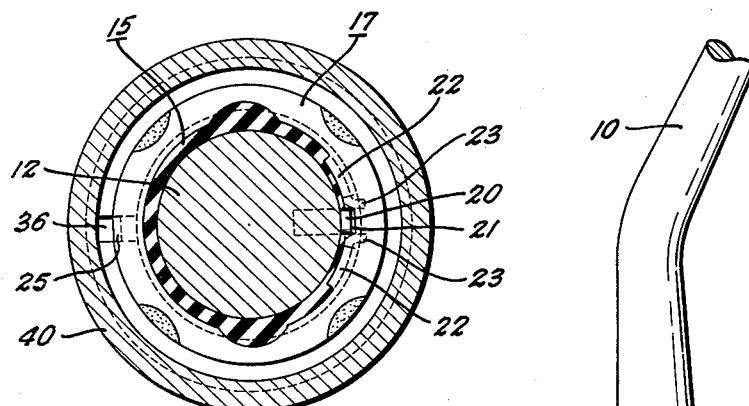
Fig. 2 is a horizontal section on line 2—2 of Fig. 1.
Figure 1:
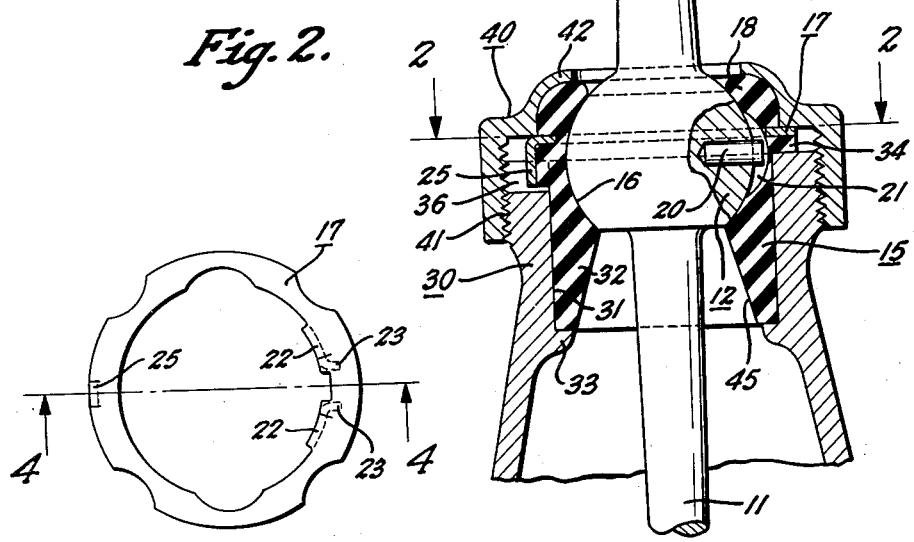
Fig. 1 is a vertical section through the entire assembly of an automobile gear shift lever and its support, made according to this invention.
Figure 3:
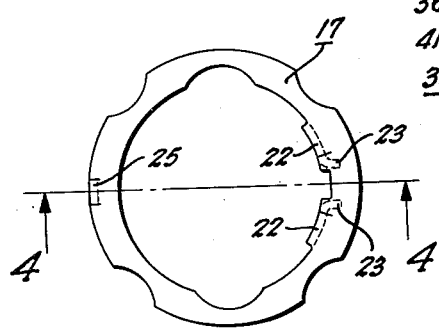
Fig. 3 is a plan view of the metal insert which is molded in situ in the resilient rubber socket member.
Figure 4:
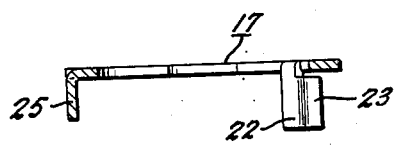
Fig. 4 is a section on line 4—4 of Fig. 3.

The gear shift lever has an upper handle portion 10, a lower actuating portion 11 which serves to actuate the shifting mechanism in the transmission (not shown), and an intermediate ball 12 which ordinarily is and is here shown as integral with the portions 10 and 11.

A one-piece molded resilient rubber socket member 15 is provided which has a parti-spherical socket 16 which fits snugly upon the metal ball 12 and serves as a universal support therefor. Preferably the rubber member 15 is molded with a metal annulus 17 vulcanized thereto and partially imbedded therein as an insert. Annulus 17 is located near the central portion of and surrounds the socket 16 and thus serves to reinforce the resilient rubber all around the ball 12 in such manner as to limit the lateral compression of the rubber socket when the ball 12 is forced laterally thereagainst when the gear shift lever is operated. However the central hole in annulus 17 is made sufficiently large to permit ball 12 to be pressed through one open end of the rubber socket member 15 when these parts are first assembled together. This assembling of socket member 15 upon the ball 12 is done simply by threading one end of the gear shift lever through the rubber member 15 and then forcing the ball 12 into the socket 16 by stretching the overhanging portions 18 of the resilient rubber. This method is simple and easy and permits the socket member 15 to be molded in one piece due to the flexibility of the upper overhanging lip 18 of the socket member.

Preferably means are provided to prevent the gear shift lever from turning on its own axis in the socket support. In the form shown, this is done by the metal pin 20 projecting from ball 12 and extending radially outward from its center into a small vertical slot 21 molded in the rubber member 15. Preferably the metal insert ring 17 is provided with two depending lugs 22 each having a small vertical flange 23 which lie flush with the opposite vertical sides of slot 21. Thus the projecting end of pin 20 will ride against the vertical metal flanges 23 rather than against the rubber, as more clearly shown in Fig. 2.

The metal insert ring 17 also has a depending lug 25 which projects radially out beyond the main cylindrical outer wall of socket member 15 and serves as a lug to positively prevent rotation of the socket member 15 within its stationary housing 30 into which it is clamped as described below.

After socket member 15 is assembled upon the gear shift lever as above described, this assembled unit is set snugly down into the cylindrical recess 31, the lower edge of the conical portion 32 thereof resting upon the metal shoulder 33. Also the radial rubber flange 34 rests upon the top of the housing 30, while the radial projection 25 fits into the recess 36 provided therefor. The housing cap 40 is then slipped over the upper end of the gear shift lever and screwed down upon the external threads 41 on housing 30, thus clamping the rubber socket member 15 firmly in place. Note that the metal cap 40 exerts its main clamping pressure against the exposed top of the radially projecting metal insert ring 17 rather than against the overhanging lip 18 of the resilient rubber. However this overhanging rubber lip 18 is snugly backed up by the metal flange 42 on cap 40 when it is in its final position and thus the ball 12 is resiliently maintained against upward withdrawal from the rubber socket member 15. It will now be clear that the ball 12 is completely supported by resilient rubber and is permitted a universal movement to the desired degree, but nevertheless is prevented from turning on its own vertical axis.

The rubber used for molding socket member 15 is preferably compounded with a suitable proportion of duprene (which is an oil-resistant synthetic rubber) and the desired proportion of finely divided graphite. This provides for self-lubrication of the ball and socket joint for a long period of use without any attention from the user. Of course if there is little possibility of oil coming into contact with the rubber member 15 the duprene may be omitted therefrom. The rubber 15 is vulcanized to such a degree of semi-softness that it will properly retain the ball 12 against being pushed down and out of the rubber socket 16 by any down force ordinarily exerted on the hand lever 10. The conical recess 45 permits the desired angular movements in any direction of the lower portion 11 of the gear shift lever.

While the embodiment of the present invention as herein disclosed, constitutes a preferred form, it is to be understood that other forms might be adopted, all coming within the scope of the claims which follow.

What is claimed is as follows:

1. In combination, an actuating lever having an intermediate ball thereon and a handle portion and actuating portion projecting from opposite sides of said ball, an annular resilient rubber bushing supporting said lever, said resilient bushing having two opposed open ends thru which said handle portion and actuating portion respectively project and a spherical socket sliding bearing for said ball, said socket enclosing said ball to such extent as to resiliently retain said ball against endwise movement of said lever in either longitudinal direction, the rubber material of said resilient support being sufficiently expandable to permit said ball to be initially forced endwise into place within said socket while said support is detached from other parts, a reinforcing metal annulus surrounding the central portion of said socket and serving to substantially limit the lateral movement of said ball in said rubber socket, and a rigid retaining member for said resilient support.

2. A device as set forth in claim 1 in which said metal annulus is embedded in the resilient rubber and surrounding the central portion of said spherical socket in such manner as to materially limit the lateral deflection of said ball within said socket without materially limiting the expandability of the rubber support to permit the initial forcing of the ball into its socket.

3. In combination, an actuating lever having a ball thereon, an annular resilient rubber cushioning support for said lever, said resilient rubber support having a spherical rubber socket bearing for resiliently retaining said ball in position therein, and a substantially flat metal ring embedded in the rubber and surrounding the central portion of said socket and normally spaced from said ball within said socket by a relatively narrow distance whereby to substantially limit the lateral deflection of said ball.

4. In combination, an actuating lever having a ball thereon, an annular resilient rubber cushioning support for said lever, said resilient rubber support having a spherical rubber socket bearing for resiliently retaining said ball in position therein, said ball having a substantially central projection thereon riding within a slot provided therefor in said resilient rubber support, and a metal member embedded in the rubber support and having portions reinforcing the sides of said slot against which said projection bears.

HARVEY D. GEYER.